United States Patent
Schultz et al.

(10) Patent No.: US 6,463,209 B2
(45) Date of Patent: Oct. 8, 2002

(54) CONTROLLED DATA FLOW

(75) Inventors: Mark Alan Schultz, Carmel; Donald Henry Willis, Indianapolis; Jianlei Xie, Carmel; John Alan Hague, Indianapolis, all of IN (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/024,555

(22) Filed: Feb. 17, 1998

(65) Prior Publication Data

US 2001/0026675 A1 Oct. 4, 2001

Related U.S. Application Data

(60) Provisional application No. 60/039,573, filed on Feb. 18, 1997.

(30) Foreign Application Priority Data

Feb. 19, 1997 (GB) .............................................. 9703467

(51) Int. Cl.⁷ .............................................. H04N 5/781
(52) U.S. Cl. ....................... 386/125; 386/111; 386/126
(58) Field of Search ............................. 386/46, 68, 70, 386/95, 111, 112, 125, 126, 109; H04N 5/781

(56) References Cited

U.S. PATENT DOCUMENTS

| | | | | |
|---|---|---|---|---|
| 5,305,113 A | * | 4/1994 | Iwamura et al. | 386/68 |
| 5,502,570 A | * | 3/1996 | Shikakura et al. | 386/95 |
| 5,841,938 A | * | 11/1998 | Nitta et al. | 386/68 |
| 5,923,815 A | * | 7/1999 | Park | 386/68 |
| 5,949,953 A | * | 9/1999 | Shirakawa et al. | 386/70 |
| 5,991,502 A | * | 11/1999 | Kawakami et al. | 386/109 |
| 6,009,229 A | * | 12/1999 | Kawamura | 386/68 |
| 6,141,491 A | * | 10/2000 | Yamagishi et al. | 386/109 |

* cited by examiner

*Primary Examiner*—Huy Nguyen
(74) *Attorney, Agent, or Firm*—Joseph J. Tripoli; Harvey D. Fried; Francis A. Davenport

(57) ABSTRACT

A method for controlling MPEG compatible data reproduced in sectors by a digital video disk player. The method comprises the steps of transducing groups of sectors including requested sectors having MPEG compatible data required for processing, and unrequested sectors having MPEG compatible data not required for processing. Coupling the requested sectors exclusive of the unrequested sectors to a data processor for processing. Processing the requested data sectors to extract the required MPEG compatible data representative of video information.

1 Claim, 5 Drawing Sheets

EQU 1  PIC A = 8 SECTORS
EQU 2  PIC A = 1048 +6 * 2048 + 499 BYTES
       PIC A = 13,835 BYTES

CONTROLLED DATA FLOW

This is a non-provisional application of provisional application Ser. No. 60/039,573 filed Feb. 18, 1997 by Mark A. Schultz et al.

FIELD OF THE INVENTION

This invention relates to the reproduction of a digitally encoded signal from a medium and in particular to the selection of reproduced data for subsequent processing.

BACKGROUND OF THE INVENTION

The introduction of disks recorded with digitally compressed audio and video signals, for example, utilizing MPEG compression protocols, offers the consumer sound and picture quality virtually indistinguishable from the original material. However, consumer users will expect such digital video disks or DVDs to offer features similar to those of their analog video cassette recorder or VCR. For example, a VCR may reproduce in either forward or reverse directions at speeds other than the recorded speed. Such non-standard speed playback features are also known as trick play modes. The provision of trick play features are less easily provided with MPEG encoded video signals due to the hierarchical nature of the compression which forms pictures into groups having varying degrees of compression. These groups are termed groups of pictures or GOPs, and require decoding in sequence. A detailed description of the MPEG 2 standard is published as ISO/IEC Standard 13818-2. However, in simple terms, an MPEG 2 signal stream may comprise three types of pictures having varying degrees of content compression. An intra-coded frame or I frame has the least compression of the three types and may be decoded without reference to any other frame. A predicted frame or P frame is compressed with reference to a preceding I or P frame and achieves greater degree of compression than an intra-coded frame. The third type of MPEG frame, termed a bi-directionally coded or B frame, may be compressed based on predictions from preceding and/or succeeding frames. Bi-directionally coded frames have the greatest degree of compression. The three types of MPEG frames are arranged in groups of pictures or GOPs. The GOP may for example contain 12 frames arranged as illustrated in FIG. 1A. Since only an intra-coded frame is decodable without reference to any other frame, each GOP may only be decoded following the decoding of the I frame. The first predicted frame or P frame, may be decoded and stored based on modification of the stored, preceding I frame. Subsequent P frames may be predicted from the stored preceding P frame. The prediction of P frames is indicated in FIG. 1A by the curved, solid arrow head lines. Finally, bi-directionally coded or B frames may be decoded by means of predictions from preceding and or succeeding frames, for example, stored I and P frames. Decoding of B frames by predictions from adjacent stored frames is depicted in FIG. 1A by the curved, dotted arrow head lines.

The hierarchical nature of the coded frames comprising MPEG groups of pictures necessitates that the I and P frames of each GOP are decoded in the forward direction. Thus, reverse mode features may be provided by effectively jumping back to an earlier, or preceding I frame and then decoding in a forward direction through that GOP. The decoded frames being stored in frame buffer memories for subsequent read out in reverse to achieve the desired reverse program sequence. FIG. 1B illustrates play back in the forward direction at normal speed and at a time prior to time to, a reverse three times speed mode trick play mode is selected. The trick play mode is initiated at time t0 where I-frame I(25) is decoded and displayed. The next frame required for decoding is I-frame I(13), thus the transducer is repositioned, as indicated by arrow J1 to acquire frame I(13). Having recovered and decoded I-frame I(13), the transducer tracks, as indicated by arrow J2 to acquire and decode frame P(16). The process is repeated as indicated by arrows J3, J4. Following the acquisition and decoding of frame P (22) the transducer is moved as depicted by arrow Jn to recover frame I(1). To smoothly portray scene motion requires the decoding and display of I, P, and possibly B-frames. The jump and play process is repeated for preceding GOP, thereby progressing haltingly backwards through the records whilst smoothly portraying the program material in a reverse sequence at the video output.

The transducer or opto-pickup is servo controlled to follow the recorded track and to maintain optical focus. In addition the transducer may be repositioned or jumped to a specific sector of the recorded track responsive to a sector address coupled to the transducer control servo system. Such a transducer jumps may result from parental guidance selection, alternative angle selection, user searching or trick mode reproduction. During transducer repositioning the reproduced bitstream will disappear and the error correction buffer will contain gaps. However such gaps are of short duration and are flagged by a data valid signal. The transducer is quickly repositioned and refocuses to acquire data from the recorded track, however, the recovered data may precede that requested since it was transduced from sectors occurring possibly one revolution before the wanted sector address. This acquisition of unwanted data results as the disk rotates to position, or approximately position, the wanted sector under the transducer. Thus, although the transducer is repositioned, the error corrected bitstream 41 coupled to the back end initially includes data from unwanted preceding sectors which must be identified by a microcontroller and discarded. Such processing of unwanted replay data represents unnecessary, additional microcontroller and buffer memory utilization.

SUMMARY OF THE INVENTION

In an inventive arrangement, unnecessary processing of unwanted sector data is avoided. A method for controlling data reproduced in sectors by a disk player employing optical read out, comprises the steps of transducing groups of sectors including sectors wanted for processing, and sectors unwanted for processing. Supplying the wanted sectors exclusive of the unwanted sectors to a data processor for processing, and processing the wanted data sectors to extract data therein representative of video information.

DETAILED DESCRIPTION

Figure 2:
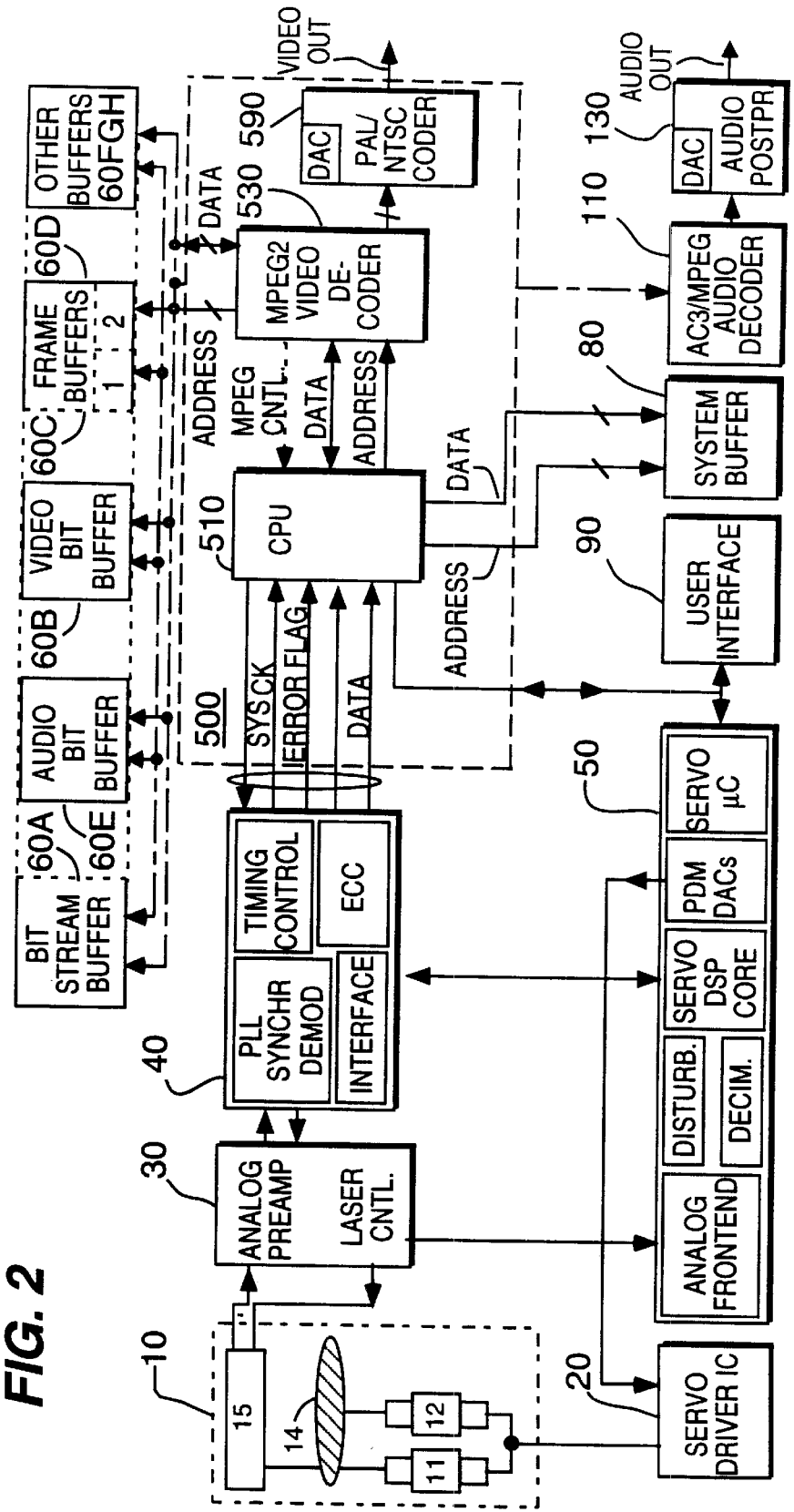
FIG. 2 is a block diagram of an exemplary digital video disk player including inventive arrangements.

FIG. 2 depicts an exemplary block diagram of a digital video disk player. In block 10 a deck is shown which may accept a digitally recorded disk 14 for rotation by a motor 12. A digital signal is recorded on disk 14 as a spiral track containing pits with respective pit lengths determined by an 8/16 modulation coding responsive to respective signal data bits. The record on disk 14 is read by pick up 15 which gathers reflected illumination from a laser. The reflected laser light is collected by a photo detector or opto pick-up device. An imaging device, for example a lens or mirror, which form part of pick-up 15, is servo controlled and driven by motor 11 to follow the recorded track. Different parts of the recording may be accessed by rapidly repositioning the imaging device. Servo controlled motors 11 and 12 are driven by integrated circuit drive amplifier 20. Pick up 15 is coupled to an opto preamplifier, block 30, which includes drive circuitry for the laser illuminator and a preamplifier which provides amplification and equalization for the reflected signal output from the opto pick-up device. The amplified and equalized replay signal from opto preamplifier 30 is connected to a channel processor block 40 where the replay signal is employed to synchronize a phase locked loop which is utilized to demodulate the 8/16 modulation employed for recording.

The MPEG encoded bitstream is encoded for error correction corrected by means of Reed Solomon product coding which is applied in blocks of 16 sectors, where each sector contains 2048 bytes of data. Thus following 8:16 demodulation the replay data stream is de-interleaved or unshuffled and error corrected by means of Reed Solomon product correction implemented in ECC buffer memories 45, and 46 of FIG. 4. Each buffer stores 16 sectors of the replay data stream arranged as an array to facilitate de-interleaving and to enable the required row and column product processing. The cascaded ECC buffer memories introduce a delay to reproduced serial bit stream which is approximately calculated by (2*16*1.4) milliseconds, where 2 represents the pair of ECC buffers, 16 represents the number of sectors over which the correction is applied and 1.4 milliseconds represents a sector period at 1× rotational speed. Thus the reproduced serial bit stream is delayed by a minimum of approximately 45 milliseconds.

The error corrected signal bitstream 41 is coupled via a link processor to a bit stream or mechanical/track buffer memory 60A. The track buffer comprises a DRAM memory type and is used to store an amount of replayed data such that data losses during transducer or pickup 15 repositioning will not result in any visible deficiency when decoded. Thus the final output image stream will appear to be continuous or seamless to the viewer. Bitstream buffer memory 60A is part of an exemplary 16 megabit DRAM memory. A further exemplary 16 megabit SDRAM memory block is partitioned to provide frame buffers 60C and 60D which provide storage for at least two decoded image frames, compressed video bit stream storage prior to decoding in buffer 60B, an audio bit stream buffer 60E and other storage in buffer 60F. The channel processor 40 also includes timing control circuitry which control writing by link 505 to bitstream buffer 60A. Data may be intermittently written to the bitstream buffer as a consequence of changes in replay track addresses, for example, resulting from user defined replay video content such as a "Directors cut", parental guidance selection, or even user selectable alternative shot angles. To facilitate more rapid access and recovery of the recorded signal, disk 14 may be rotated at an increased speed resulting in the transduced bitstream having a higher bit rate, and possibly intermittent delivery. This higher speed, bursty bitstream may be effectively smoothed by writing the intermittent bitstream to buffer 60A and reading out for subsequent processing and MPEG decoding at a lower, more constant rate.

As has been described, the recorded data stream is arranged in ECC blocks of 16 sectors. Each sector has a unique sector identification address which is protected with error correction bits and these are processed at ECC block 47 of FIG. 4. However, because the sector address is short and sector specific, error correction processing by block 47 introduces only an insignificant delay to sector address signal 42 (of FIG. 4) which is coupled to provide position information to servo control integrated circuit 50. Integrated circuit 50 provides drive and control signals for servo motors 11 and 12. Motor 12 rotates disk 14 and provides servo controlled rotation at a plurality of speeds. The opto pickup or transducer 15 is positioned and servo controlled by motor 11 responsive to sector address signal 42, and in addition, may be controlled to rapidly reposition or jump to another sector address, or location on the disk surface in response to a sector address request, transmitted by I²C control bus 514, and illustrated at element 54 of FIG. 4. The digital video disk player is controlled by a central processing unit or CPU, element 510 of block 500, which accepts the reproduced bitstream and error flags from channel IC 40, and provides control instructions to servo IC 50. In addition CPU 510 accepts user control commands from user interface 90, and MPEG decoder control functions from the MPEG decoder element 530 of block 500. A system buffer memory 80 is addressed by and provides data to CPU 510. For example, buffer 80 may comprise both RAM and PROM memory locations. The RAM may be used to store various data extracted from bitstream 41 by CPU 510 for example such data may include descrambling or decryption information, bitstream and frame buffer memory management data, and navigation data. The PROM may, for example contain, transducer jump algorithms which facilitate trick mode operation at a selection of speeds in forward or reverse directions.

Figure 3:
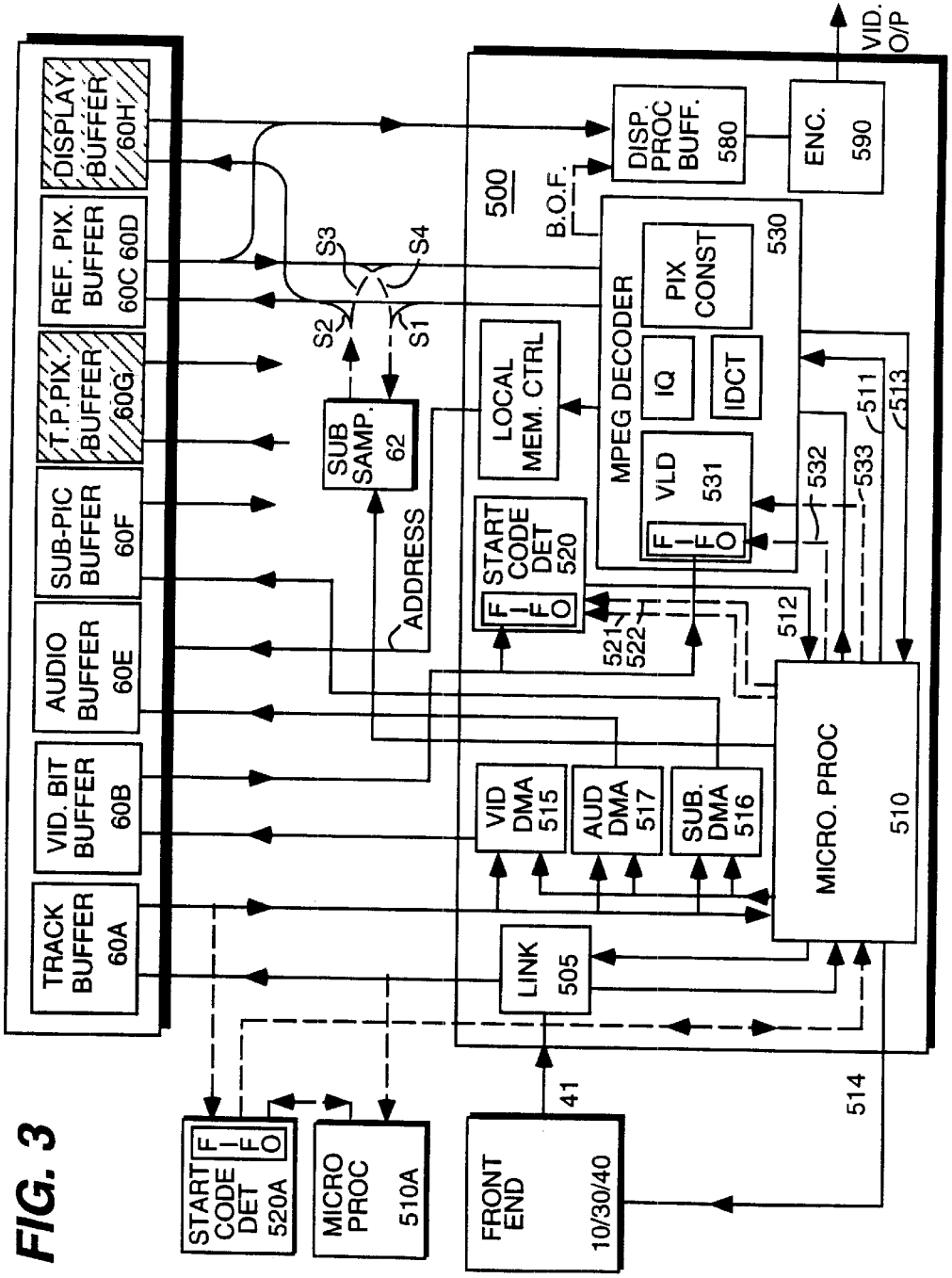
FIG. 3 is a block diagram showing in greater detail part of FIG. 2 and depicting various inventive arrangements.

The MPEG encoded bitstream is coupled to link processor 505 in FIG. 3, which may function as a hardware demultiplexor to separate audio, video and control information from the encoded bitstream. Alternatively, bitstream demultiplexing may be accomplished by software control of direct memory access, DMA of buffer 60A, from CPU 510 of FIG. 3. The encoded bitstream in track buffer 60A is searched by microcontroller 510 to locate and read headers and to extract navigation data.

Figure 5A:
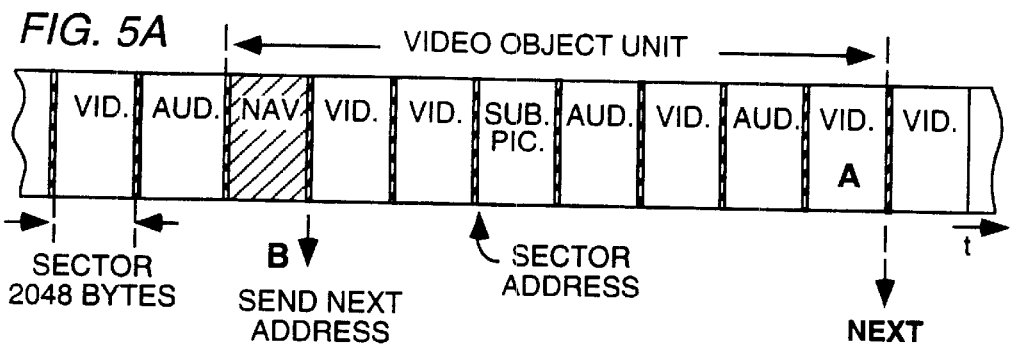
FIG. 5A depicts an exemplary bit stream before track buffering.

Microcontroller 510 is coupled the front end via I²C control bus signal 514 to control or request transducer repositioning to acquire the next sector required by a trick play sequence. The transducer positioning may be controlled by an advantageous stored sequence, or jump play pattern which is indexed with reference to replayed sector addresses and GOP sector addresses read from the navigation pack data at the start of each video object unit or VOBU. Exemplary sector addresses and VOBU navigation pack are depicted in FIG. 5A. However, following transducer repositioning, the sectors initially retrieved from the front end may be identified by exemplary microcontroller 510 as not those requested by the jump instruction. Thus, microcontroller 510 advantageously overwrites this unwanted data in track buffer 60A and ensures that only the desired MPEG picture data is present in the buffer.

Having identified sector addresses or headers, microcontroller 510 controls direct memory access of buffer 60A which effectively separates MPEG data from other DVD formatted data stored in the buffer. Thus, video DMA 515 separates compressed video bits which are coupled for storage in exemplary video bit buffer 60B. Similarly compressed audio bits are read from buffer 60A and stored in audio buffer 60E. Sub-picture data is also retrieved from track buffer 60A by DMA and stored in buffer 60F.

The compressed video bit stream in video bit buffer 60B is searched to locate picture or higher level start codes by start code detector 520. A detected start code signal 512 is coupled to microcontroller 510 which then communicates with MPEG decoder 530, via signal 511, to indicate the next picture type, the quantizer setting and to initiate decoding. A decoder status signal 513 is coupled back to microcontroller 510 to indicate completion of decoding and picture data available for display or storage. Compressed video bit buffer 60B may be considered to function as a FIFO or circular buffer where the stored bitstream is sequentially accessed for MPEG decoding, however, trick mode operation may be advantageously facilitated by random access of buffer 60B, as will be described.

Within MPEG decoder 530 the video bit stream is processed by a variable length decoder 531 which searches the bitstream to locate slice and macro-block start codes. Certain decoded pictures from each group of pictures are written to frame buffers 60C and 60D for subsequent use as predictors when deriving or constructing other pictures, for example P and B pictures, of the GOP. Frame buffers 60C and 60D have a storage capacity of at least two video frames. Separated audio packets are stored in audio bit buffer 60E which is read out and coupled for audio decoding in block 110. Following MPEG or AC3 audio decoding a digitized audio signal results which is coupled to an audio post processor 130 for digital to analog conversion and generation of various base band audio signal outputs. A digital video output signal is reconstructed in display buffer 580 from decoded blocks read from reference frame buffer 60C/D. However, during trick mode operation the output signal source may be an advantageous field memory thus block processing within display buffer 580 may be controlled responsive to trick mode operation. The display buffer is coupled to encoder 590 which provides digital to analog conversion and generates baseband video components and encoded video signals.

Figure 1A:
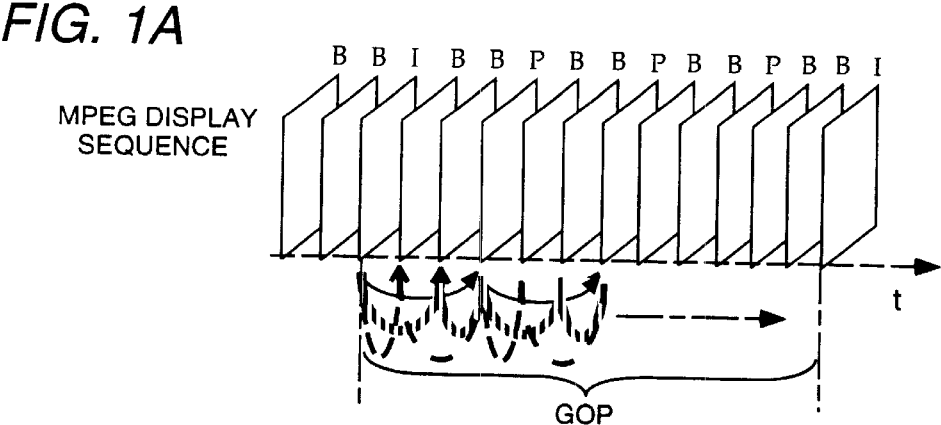
FIG. 1A illustrates an MPEG 2 group of pictures.
Figure 1B:
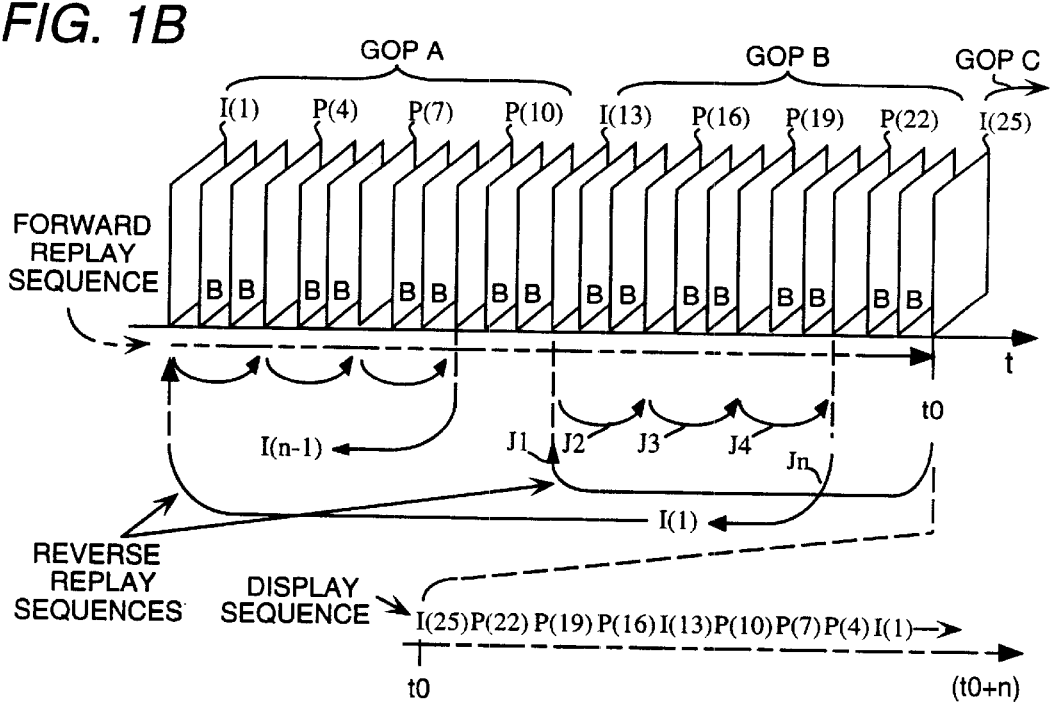
FIG. 1B illustrates recorded groups of pictures, during replay and reverse trick play at three times speed.

Operation of the exemplary video player illustrated in FIG. 2 may be considered with reference to FIG. 1B which illustrates a forward play and reverse trick play sequence. As described previously, the coded relationship existing within each GOP necessitates that each group of pictures is decoded in a forward direction starting from an I-frame or picture. Thus, reverse mode features may be provided by effectively jumping back to transduce an earlier, or preceding I picture and then decoding in a forward direction through that GOP. The decoded pictures are stored in frame buffer memories for subsequent read out in reverse order. However, sequences that include B pictures may utilize further advantageous features which will be described. In FIG. 1B it will be assumed that at some time prior to time t0, for example at I-picture I(1), the exemplary video player assumed a forward play condition in response to a user command. Each group of pictures is decoded in the forward direction as illustrated in FIG. 1A by the arrow headed lines linking I, B and P frames. At a time prior to time t0, a three times play speed reverse trick mode is selected, and initiated at time t0 where I-picture 1(25) is decoded and displayed. As previously described the next picture required for 35 reverse trick play decoding is I-picture I(13), thus the transducer is moved, as indicated by arrow J1 to acquire picture I(13). The signal recovery and decoding then follows a play sequence indicated in FIG. 1B by arrows J1, to acquire I(13), J2, to acquire P(16), J3, to P(19), J4 to P(22) . . . Jn. The intervening B pictures shown in FIG. 1B are transduced but may be discarded as required by each specific trick play mode. To avoid the previously described requirement for additional reverse mode video buffering, various advantageous methods for MPEG decoder control and buffer control and allocation are employed.

Figure 5B:
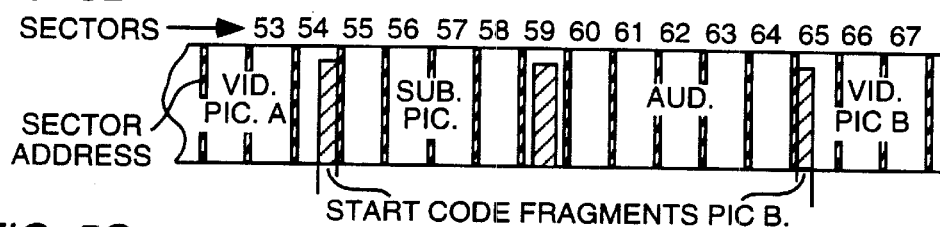
FIGS. 5B–5C depict exemplary data in buffer memory.

In a first advantageous arrangement the storage capacity video bit buffer 60B is effectively increased by selecting for storage only picture data that is to be used subsequently, for example, in an exemplary trick play mode B frames are not decoded, hence need not be stored in a video bit buffer. Thus only needed pictures are stored, and unwanted, or non-decoding picture data is discarded. To facilitate this advantageous selection between wanted and unwanted pictures requires that the video packet stream be pre-processed or searched to locate a group_of_picture_header prior to storage in buffer 60B and MPEG decoding. Thus pre-processing of the compressed video packet stream allows the determination of parameters such as, time_code, closed_gop, and broken_link data for each group of pictures or GOP. In addition, by pre-processing the video packet stream the picture_start_code may be located thus permitting processing of the picture_header which in turn allows the determination of, for example, the temporal_reference, picture_coding_type (I, P and B). As a consequence of obtaining these data, picture size may be calculated thus permitting dynamic control of memory management virtually concurrent with the header processing. However, because the DVD format partitions MPEG like data into sectors of 2048 bytes, and the video stream start codes (4 bytes) are not sector aligned start codes may be distributed across a sector boundary. A distributed start code is depicted in FIG. 5B, where a start code for picture C is initiated at byte 2046 of sector 12 and is continued in sector 13. Hence part of a start code may be in one video sector with the remainder in the next video sector. As a consequence, an advantageous bitstream searching method contends with a distributed start code by identifying and saving a partial start code and setting a flag to indicate the occurrence. In the next video sector the remainder of the start code is recovered and the partial start code is completed. However, the video sectors containing the distributed start code may be separated by other sectors containing, for example, audio, sub-pictures etc. In this situation start codes and payload data identified as from intervening non-video sectors are discarded responsive to a set partial start code flag. Thus with the occurrence of the next video sector, the remainder of the start code is recovered and the partial start code is completed.

The determination of picture data may be performed in units of sectors referenced in track buffer 60A. However, since a picture start code is not constrained to start coincident with a sector boundary the resulting location of video sectors in units of sectors may inevitably include fragments of a preceding, possibly non-video sector. Determination or location of picture data/video sectors in units of sectors is illustrated in FIG. 5B where a start code for exemplary picture A is shown in sector 2 with the start code of next picture B, occurring in sector 9. Thus equation 1 shows picture data location by sector count. Picture A starts in sector 2 and ends in sector 9, and has a duration of 8 sectors. Unwanted data fragments are illustrated FIG. 5B, where video data is referenced to (video) sector numbers, which may be directly related to the sector number or address in the reproduced bit stream. In FIG. 5B an exemplary picture A is depicted with a picture start code initiated at byte 1000 of video sector 2. Clearly the preceding 999 bytes of sector 2 correspond to data from a preceding picture. It is possible to employ more detailed processing where the picture data is located the units of bytes. Byte accurate processing may require more complexity of memory control than that required for sector level accuracy. However, if byte accurate processing is employed only complete picture data are stored in the video bit buffer, thus fragments are eliminated and hang up of MPEG decoder 530 is avoided. Byte accurate picture determination is shown in FIG. 5B for exemplary picture A, where a picture start code starts at byte 1000 of video sector 2 and picture B start code starts at byte 500 of sector 9. The size of picture A may be calculated in bytes by use of equation 2.

Having byte accurate picture addresses may allow microprocessor 510 to point to a specific byte in the video bit buffer 60B from which to start decoding by variable length decoder VLD 531 of FIG. 3.

Figure 5C:
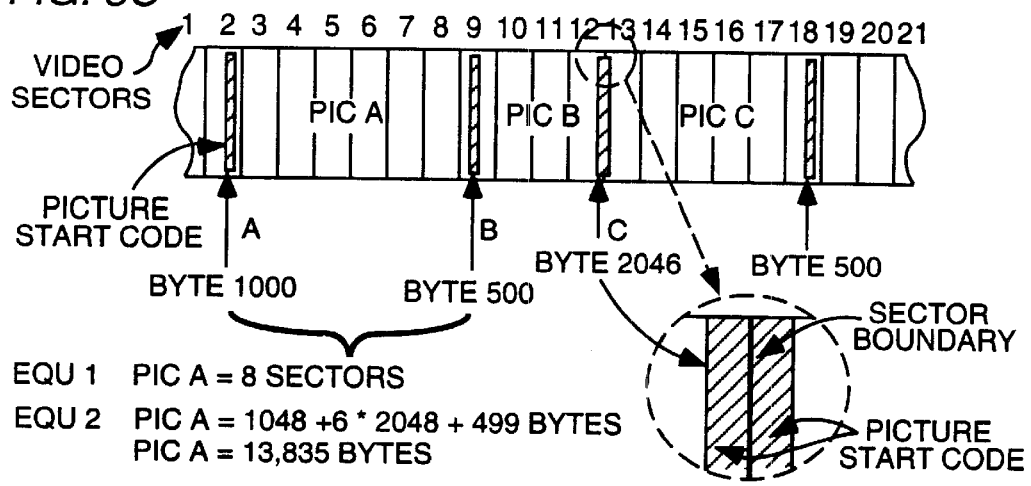
Figure 5D:
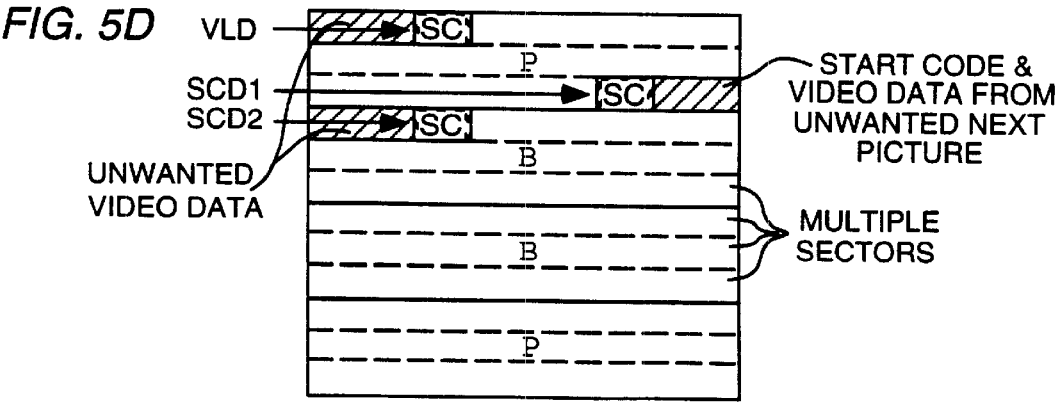

If picture data is determined in units of sectors, the MPEG decoder reading pictures from the video bit buffer must be protected from hang up due to fragments of discarded pictures occurring before or after the wanted picture is decoded. Such picture fragments are depicted in exemplary video bit buffer of FIG. 5C which shows multiple sectors containing P and B pictures where unwanted data from a previous, or following picture is shown with diagonal shading. Each video object block unit or VOBU includes navigation data that identifies the end sector address of the first I picture and the last sector addresses of two following reference or P pictures of the first GOP of the VOBU. In addition the navigation data includes sector addresses of I-pictures in preceding and succeeding VOBUs, hence an I-picture only trick mode may be all readily provided. However, problems resulting from picture fragments may be avoided if the end byte of the wanted picture can be identified. Microprocessor 510/A, for example type ST20, is configured as a hardware search engine which searches through the stored data to locate the ending byte of the I-picture within the ending sector stored in track buffer 60A. Thus by identifying an I-picture, it alone may be loaded into video bit buffer 60B, hence avoiding the storage partial pictures which may cause problems of decoder lockup. The exemplary microprocessor 510/A may b e employed to find start codes in an I-picture only mode since the ending sector is known from the navigation data. However, for P, B or multiple I-pictures of the VOBU, the exemplary microprocessor may not provide a practical solution since testing has to be performed on every byte of data in the bitstream, which represents an operationally intensive usage of microprocessor 510.

The location and determination of start codes prior to picture decoding may be facilitated by an arrangement which utilizes the link interface block 505 of FIG. 3 to search for start codes in the bitstream prior to buffer 60A. Such use of link interface 505 advantageously provides early pre-processing of picture headers which may be signaled to microprocessor 510. Thus, having identified picture headers, pictures wanted by a specific trick mode may be stored in exemplary track buffer 60A and unwanted pictures being deleted by overwriting in the buffer.

In a second arrangement, start codes are located by use of Start Code Detector 520 to search the bit stream in either the mechanical/track buffer 60A or the video bit buffer 60B. Although this method has an advantage in start code detector design is known, the data must enter the video bit buffer prior to initiating start code detection because of the MPEG bitstream requirement for contiguous data. Thus searching within the mechanical/track buffer may be difficult to facilitate. Such searching may not optimally use memory, and exemplary microprocessor 510 may be heavily loaded with interrupts, requiring the addition of a second exemplary microprocessor 510A specifically to implement start code detection.

In a further advantageous arrangement, start code detection is facilitated by a second start code detector which searches the bit stream in track buffer 60A exclusively for start codes, thus advantageously providing early pre-processing of picture headers in anticipation of processing and memory manipulation specific to trick play operation.

Various methods have been described for the location of specific pictures in terms of their disk sector address and buffer locations, however the facilitation of visually smooth trick modes clearly requires timely disk replay and specific picture access from memory. Although navigation pack data provides picture access points on the disk, these are limited in number within each VOBU. Hence to achieve temporally smooth trick modes at multiple speeds requires the formulation of a locator table where picture type is referenced to its on disk sector address and start code buffer location and address. The exemplary microprocessor 510/A may be employed to assemble the picture locator table. The use of the picture locator table permits wanted picture acquisition and manipulation.

The processing of the video packet stream prior to the video bit buffer 60B may be advantageously employed for trick mode operation. For example, at a trick play speed or in a reverse replay mode, such pre-processing permits trick play specific selection between pictures to be buffered for decoding, and those unwanted pictures to be discarded before decoding. Such picture selection, for example discarding B-frames, may approximately double the number of I and P pictures stored in video bit buffer 60B during trick play operation. Thus by selection and deletion, video bit buffer 60B stores only wanted, or trick play specific pictures, hence more video object units or VOBUs may be stored facilitating enhanced trick play operation.

It is advantageous to control MPEG picture decoding order based on knowledge of where the pictures start and stop in the video bit buffer. Thus knowledge of picture location in the video bit buffer 60B allows memory start pointers in the start code detector 520 and variable length detector 531 to be directed to effectively randomly access pictures as required, for example, during trick mode operation. Operation in reverse, at play speed and or slow motion playback requires the reproduction of B-frames. Such reverse mode operation may be advantageously simplified in terms of buffer memory requirements by reversing the order in which adjacent B pictures are decoded. This reversal of decoding order is achieved by setting the memory start pointers to enable decoding of the picture required by the trick mode. In addition buffer memory size and control may be simplified during trick play operation by advantageously skipping or not reading pictures in the video bit buffer as required by specific trick play algorithms. Trick play buffer memory size and control may be advantageously optimized by enabling multiple decoding of pictures either immediately or as specifically required by the trick play algorithm. The facilitation of these advantageous features requires careful control of read/write functions and the synchronization therebetween.

Figure 4:
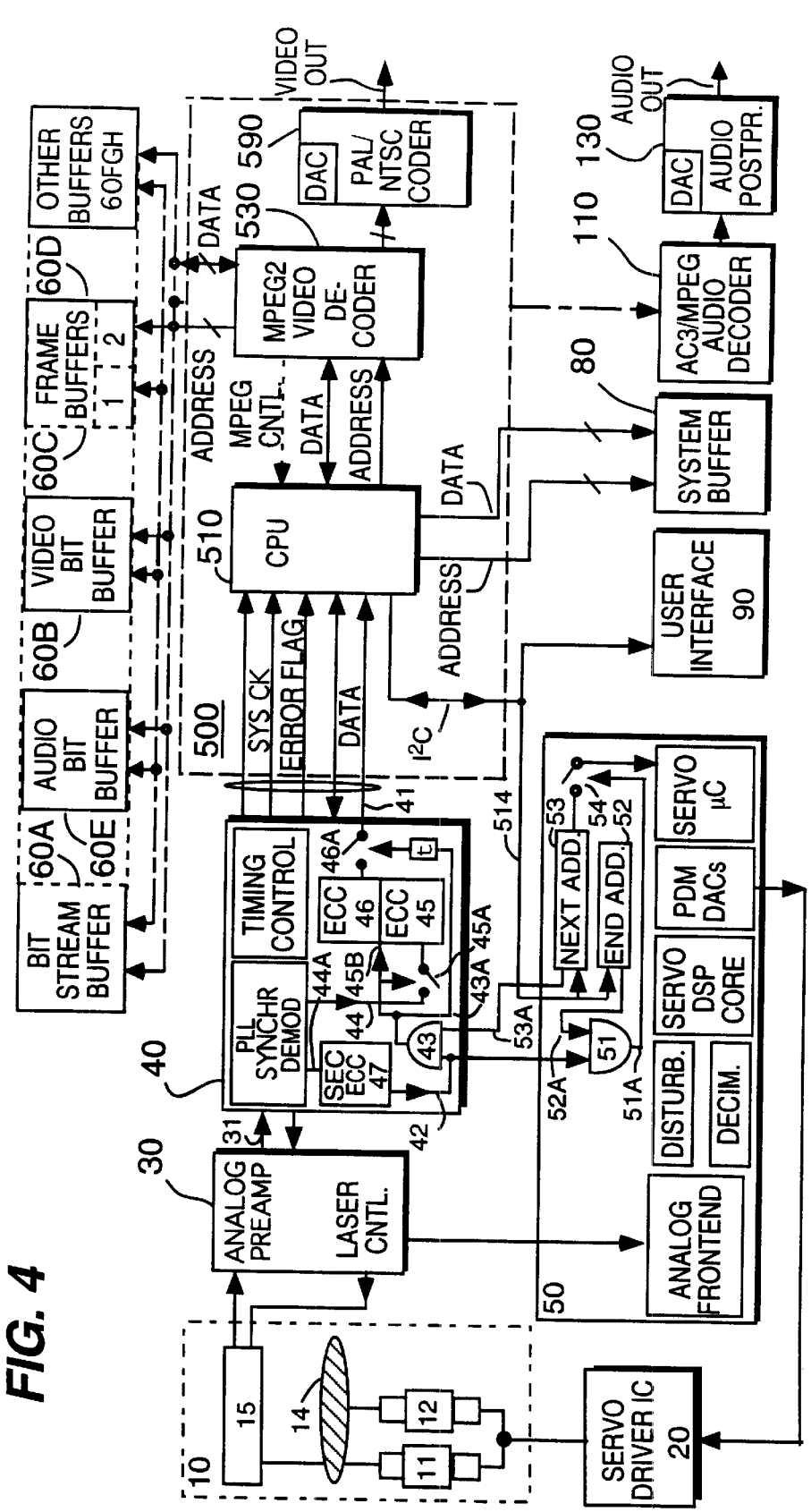
FIG. 4 is a block diagram depicting inventive arrangements in addition to those of FIG. 2.

The block diagram of FIG. 4 shows the same functions and element numbering as those depicted in FIG. 2, however, FIG. 4 includes additional inventive arrangements which will be explained.

The exemplary digital video disk player shown in FIGS. 2, 3 and 4 may be considered to comprise two parts namely a front end and a back end. The front end controls the disk and transducer with the back end providing MPEG decoding and overall control. Such functional partitioning may represent an obvious solution for consistent, steady state, MPEG decoding. However, with such partitioning of processing and control at the back end the microcontroller may become overloaded, for example, during trick mode operation and in particular when playing in the reverse direction.

As has been described, microcontroller 510 is required to manage the incoming bitstream 41 received from the front end and identify wanted from unwanted data. In a first advantageous arrangement bitstream 41 is controllably coupled between the front and back ends. In the exemplary player of FIG. 2 opto-pickup or transducer 15 may repositioned, as has been described. Sector addresses derived in the back end are sent via an I²C control bus 514 to the front end servo system 50 to reposition transducer 15. However, the opto-pickup or transducer 15 is servo controlled responsive to a sector address which is truncated to remove the least significant digit. This address truncation allows acquisition of sectors in groups or blocks of 16 sectors. This grouping is required to facilitate error correction (ECC) by means of Reed Solomon product coding and payload data interleaving applied over 16 sectors during recording. Thus information is acquired from the disk in ECC groups of 16 sectors, and in general, the retrieved data containing the wanted sector address is in advance, or preceding that requested by the back end processing. In addition, the transducer moves relative to the rotating disk with either radial or tangential motion to acquire the track containing the EEC block of sectors within which the wanted sector address or addresses reside. Thus, following repositioning, the transducer refocusses and sectors are transduced as the disk rotates towards the ECC sector block containing the requested or wanted sectors address. Hence, if worst case positioning of transducer and wanted sector address are considered, many hundreds of unwanted sectors may be transduced. The since the number of sectors increases with increasing disk radius, so too will the number of unwanted sectors reproduced. In addition acquisition of an earlier or preceding address may possibly require a complete disk revolution with resulting unwanted sector reproduction. Thus very significant amounts of unwanted data are produced prior to the occurrence of the wanted sector address. This bit stream is depicted in FIG. 4 as signal 44, and contains both wanted and unwanted data which is coupled for error correction at BCC blocks 45 and 46. The error corrected bitstream is output from ECC processing as signal 41 which is coupled to the back end where microcontroller 510 identifies wanted from unwanted data.

An inventive arrangement is shown in FIG. 4, where data signal 44 output from an 8:16 code demodulator and is coupled via a control element 45A, for example a transmission gate, or logic function, to Reed Solomon error correction blocks 45 and 46. Control element 45A is controlled by element 43 which functions to compare the recovered, current replay sector address, error corrected in block 47 and output as address signal 42, with a sector address 53A, derived from the back end, which represents the next wanted data, for example picture type. The comparison may be facilitated by a comparator or logical function. Thus when the replay sector address 42 equals address 53A requested by the back end, the demodulated data output is enabled by signal 43A for coupling to error correction buffer blocks ECC 45 and 46. Since error correction is applied to groups of 16 sectors, the comparison of requested address with actual address is performed such that the ECC block of sectors containing the wanted sector is enabled for Reed Solomon correction. For example, sector address comparison may be facilitated with addresses having a least significant bit truncated.

Since, for example, a B type MPEG picture may occupy 3 sectors where as an I type MPEG picture may require 30 sectors or more, the requested sector address represents the initial data sector of a wanted picture type. In addition signal 43A, which represents substantial equality between wanted and replay sector addresses, may be considered to represent a latch function where the logical state is maintained until the wanted address is changed i.e. until a further transducer jump is requested. The receipt of a new sector address changes the state of signal 43A, which inhibits reproduced data until the new wanted address occurs in the replay signal and is detected by comparitor 43. Stated differently, signal 44 remains enabled for error correction, FCC blocks 45 and 46 are enabled and output signal 41 is sustained, or in simple terms, the disk continues to play until a different transducer position is requested.

The detected replay occurrence of the wanted sector may be performed by comparison with truncated sector addresses to ensure that error correction buffers 45 and 46 are filled with the number of sectors required for RS correction. In a further embodiment, the same detected replay occurrence may be employed using signal 45B to control or enable operation of error correction buffer memory 45 and 46. In an alternative inventive arrangement only the requested sector is enabled via output control element 46A. Selection by element 46A is different from the control provided by elements 45A and 45B which, because of the interleaved, or shuffled data format enable the ECC block containing the requested sector. Detection of the wanted replay sector may be performed by comparison of the actual replay sector address and the requested or wanted address. However, because this control function is performed essentially following error correction and de-shuffling which utilize buffer memory, the resultant output signal 41 is delayed by at least one ECC block time period. Hence error corrected output data corresponds to groups of sectors transduced in advance of the wanted data (address) identified as present at the ECC buffer input. Clearly since the buffer delay is known it may be compensated for in the control coupling of signal 43A to element 46A, for example by use of a delaying method depicted as t. Control element 46A is depicted as a series switch element capable of enabling or disabling bitstream supply to the back end. Thus signal 43A, suitably timed to compensate processing and buffer delays, may be applied to selectively enable de-interleaving bitstream 41 for transmission to processing block 500. The use of the preceding inventive embodiments permits only transduced data from requested sectors to be coupled to the back end for storage and decoding, thus reducing microcontroller 510 work load.

What is claimed is:

1. A digital disk player for reproducing sectors containing MPEG compatible data, comprising:
a transducer for transducing from a disk, groups of sectors including a requested address sector having MPEG compatible data required for processing and unrequested sector addresses having MPEG compatible data not required for processing;
a selector coupled to said transducer for selecting said requested address sector having MPEG compatible data exclusive of said unrequested sector addresses, wherein the transducer and selector form a front end;

a memory coupled to said selector for storing only said requested address sector; and, a decoder forming a back end for decoding said requested address sector.

* * * * *